2,872,468
ORGANIC DERIVATIVES OF TETRAVALENT TIN

William E. Leistner, Brooklyn, and Arthur C. Hecker, Richmond Hill, N. Y., assignors to Argus Chemical Laboratory, Inc., a corporation of New York No Drawing. Application October 16, 1952
Serial No. 315,182

7 Claims. (Cl. 260—429.7)

The present invention relates to novel organic derivatives of tetravalent tin and to compositions containing the same. This is a continuation in part of Serial No. 270,531, filed February 7, 1952, now Patent No. 2,641,596.

The derivatives according to our invention are derived from tetravalent tin by having at least one valence and at the utmost three valences linked to the sulfur atoms of an ester of a mercapto alcohol with a dibasic acid, while the remaining valence or valences are bound to an alkyl, aryl, hydroaromatic or heterocyclic radical.

The compounds are represented by the type formula $$R_n\text{—Sn—}X_{4-n}$$

wherein R stands for a radical selected from the group consisting of alkyl, aryl, hydroaromatic or heterocyclic radicals, X for the radical of an ester of a mercapto alcohol having from 2 to 4 carbon atoms with an aliphatic aromatic or hydroaromatic dibasic acid containing from 6 to 12 carbon atoms, and $n$ for an integral number from 1 to 3.

Examples for R are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_8H_{17}O$, $C_6H_5O$, $C_6H_4(CH_3)O$, $C_6H_3(CH_3)_2O$; and the furfuryl and tetrahydrofurfuryl groups.

Examples for X are esters of mercapto alcohols, such as mercapto ethanol, $HS.CH_2.CH_2.OH$, or mercapto butanol, $HS.CH_2.CH_2.CH_2.CH_2OH$; with aliphatic, hydroaromatic, or aromatic dibasic acids containing from 6 to 12 carbon atoms. Taking as specific examples with R=butyl, and X=the mercapto ethanol adipic acid esters, the product may have the following formulas:

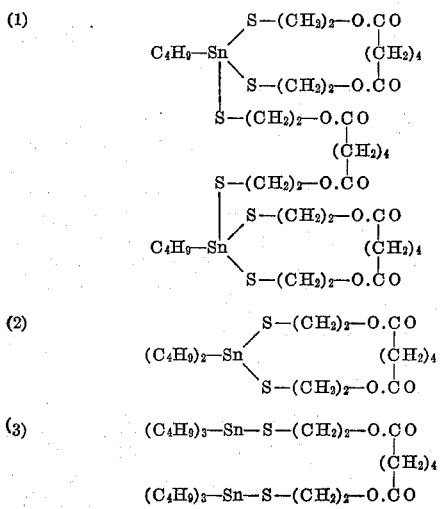

The novel tin compounds according to our invention are either oily liquids of high viscosity or amorphous solids whose composition has in each case been ascertained by analysis. Most of them are soluble in many organic solvents, for instance in ether, benzene, toluene, chloroform, carbontetrachloride, etc.

A general method to prepare these compounds is first to prepare the desired ester of the mercapto alcohol and dibasic acid chosen, and subsequently to react the ester with an organic tin halide, organic tin oxide, or a stannonic acid, containing an organic radical.

The invention will now be illustrated by a number of examples, but it should be understood that these are given by way of illustration and not of limitation and that many variations in the compounds given and the amounts indicated can be made without departing from the spirit of the invention and the scope of the appended claims.

EXAMPLE 1

The preparation of dibutyl-tin di-mercapto ethanol adipate

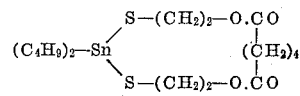

Two mols of mercapto ethanol, one mol of adipic acid, 70 cc. benzene, to which 0.3 gram p-toluene sulfonic acid were added, are refluxed and 36 cc. water eliminated by azeotropic distillation.

Subsequently, one mol of dibutyl tin oxide is added, refluxing being continued until another 18 cc. of water have distilled off. Slight impurities are filtered off and the benzene is distilled off. The residue is a very viscous liquid of a brownish color. It is soluble in ether, chloroform, carbontetrachloride, benzene, toluene, xylene, and other organic solvents.

Analysis

|  | Sn | S |
|---|---|---|
| Calc. values | 23.8 | 12.9 |
| Found values | 24.2 | 12.6 |

EXAMPLE 2

Preparation of tribenzyl tin dimercapto butanol azelaic acid ester

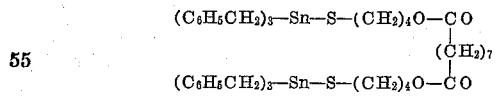

Two mols mercapto butanol, one mol azelaic acid, 150 cc. benzene, to which 0.3 gr. paratoluene sulfonic acid were added, are refluxed and 36 cc. water eliminated by azeotropic distillation.

Subsequently, 2 mols tribenzyl tin chloride are added and refluxed for 2 hours.

The reaction product is washed with water, the organic layer separated, filtered, and the benzene distilled off.

The final product is similar to the product obtained according to Example 1.

*Analysis*

|  | Sn | S |
|---|---|---|
| Calc. values | 20.65 | 5.6 |
| Found values | 21.2 | 5.4 |

EXAMPLE 3

Preparation of mono-isopropyl tin di-mercapto ethanol terephthalate

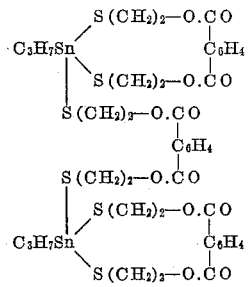

Two mols of mercapto ethanol, one mol of terephthalic acid, 150 cc. benzene, to which 0.5 paratoluene sulfonic acid were added, are refluxed until 36 cc. water are eliminated by azeotropic distillation.

Subsequently ⅔ mol of iso-propyl stannonic acid, prepared as described in the literature, are refluxed with the ester until the theoretic amount of water is driven off. Slight impurities are filtered off and benzene is removed by distilling. The residue in this case is a brown solid which represents obviously a material polymerized to some extent and which is only slightly soluble in benzene and is much better soluble in chloroform.

*Analysis*

|  | Sn | S |
|---|---|---|
| Calc. values | 20.1 | 16.35 |
| Found values | 19.8 | 16.6 |

The novel compounds made according to the method described above may be used for various purposes. They are excellent stabilizers for chlorinated and other high molecular weight halogenated material and may be used as antioxidants. They may also be interesting as such, or as intermediates for pharmaceuticals and cosmetics.

In case the compounds are used as stabilizers, the amount by weight of the same will be from 0.1 to 10%.

In the following, examples will be given for the manufacture of a plastic film, in which the compounds according to the present invention are used as stabilizers.

EXAMPLE 4

100 parts of vinylite VYNW (vinyl chloride and acetate copolymer), 50 parts dioctyl phthalate, and 2 parts of the product of Example 1 as stabilizer are mixed by tumbling for a period of one hour. The whole mass is then transferred to a Banbury mixer and fused for 10 minutes at a temperature of approximately 300° F. It is then dropped and transferred to a warmup mill, whose roll temperature is likewise maintained at 300° F. The material is then fed as needed to a 3 or 4 roll calender. The roll temperatures of the calender range from 280°–350° F. The vinyl compound is calendered into a film at 0.004 inch or any other desirable gage.

EXAMPLE 5

A comparison test was made in which chlorinated paraffin was heated over a period of time, without any addition on the one hand, and with addition of a stabilizer made according to the invention on the other hand.

In this test, a nitrogen current was passed through chlorinated paraffin containing 40% chlorine, at a temperature of 150° F. for 12 hours. During the test, the paraffin lost 10% chlorine.

The same chlorinated paraffin, to which 3% of the product obtained in Example 2 were added, was treated in a similar manner and showed a loss of only 1% chlorine after 12 hours.

EXAMPLE 6

The following procedure is used to advantage in making a finished solution of the resin. We use 100 parts of vinylite VYNW (vinyl chloride and acetate copolymer) along with 40 parts of tricresylphosphate. This is weighed into a dry blender; 1 part of stabilizer (made as described in Example 2) is then added. The whole mass is agitated by tumbling for 30 minutes and then transferred to a 2-roll mill whose roll temperatures are about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

What we claim is:

1. As a new compound, a product corresponding to the formula $$R_n\text{—}Sn\text{—}X_{4-n}$$

wherein R stands for a radical selected from the group consisting of alkyl, phenyl, tolyl, xylyl, phenoxy, methylphenoxy, dimethylphenoxy, furfuryl and tetrahydrofurfuryl, X for a radical of an ester of a mercapto alcohol having from 2–4 carbon atoms with an acid selected from the group consisting of a saturated dibasic aliphatic acid having from 6–12 carbon atoms and terephthalic acid, and $n$ for an integer from 1–3, and wherein the sulfur of the mercapto alcohol is connected to the tin.

2. As a new compound, a product corresponding to the formula $$R_n\text{—}Sn\text{—}X_{4-n}$$

wherein R stands for a radical selected from the group consisting of alkyl, phenyl, tolyl, xylyl, phenoxy, methylphenoxy, dimethylphenoxy, furfuryl and tetrahydrofurfuryl, X for a radical of an ester of mercapto ethanol with an acid selected from the group consisting of a saturated dibasic aliphatic acid having from 6–12 carbon atoms and terephthalic acid, and $n$ for an integer from 1–3, and wherein the sulfur of the mercapto ethanol is connected to the tin.

3. As a new compound, a product corresponding to the formula $$R_n\text{—}Sn\text{—}X_{4-n}$$

wherein R stands for a radical selected from the group consisting of alkyl, phenyl, tolyl, xylyl, phenoxy, methylphenoxy, dimethylphenoxy, furfuryl and tetrahydrofurfuryl, X for a radical of an ester of mercapto butanol with an acid selected from the group consisting of a saturated dibasic aliphatic acid having from 6–12 carbon atoms and terephthalic acid, and $n$ for an integer from 1–3, and wherein the sulfur of the mercapto butanol is connected to the tin.

4. As a new compound, a product corresponding to the formula $$R_n\text{—}Sn\text{—}X_{4-n}$$

wherein R stands for a radical selected from the group consisting of alkyl and phenyl, X for a radical of an ester of a mercapto alcohol having from 2–4 carbon atoms with a saturated aliphatic dibasic acid and $n$ for an integer from 1–3, and wherein the sulfur of the mercapto alcohol is connected to the tin.

5. As a new compound, dibutyl tin dimercaptoethanol adipate.

6. As a new compound, tribenzyl tin dimercaptobutanol azelaic acid ester.

7. As a new compound, mono-isopropyl tin dimercaptoethanol terephthalate.

References Cited in the file of this patent

UNITED STATES PATENTS

| | | |
|---|---|---|
| 2,479,918 | Fincke et al. | Aug. 23, 1949 |
| 2,560,034 | Eberly | July 10, 1951 |
| 2,592,926 | Mack et al. | Apr. 15, 1952 |
| 2,604,483 | Mack et al. | July 22, 1952 |
| 2,648,650 | Weinberg et al. | Aug. 11, 1953 |